United States Patent [19]

Avakian et al.

[11] Patent Number: 5,326,803
[45] Date of Patent: Jul. 5, 1994

[54] ORGANOHYDROGEN POLYSILOXANE COATED PHOSPHITES

[75] Inventors: Roger W. Avakian; James A. Mahood, both of Parkersburgh, W. Va.

[73] Assignee: General Electric Company, Pittsfield, Mass.

[21] Appl. No.: 10,219

[22] Filed: Jan. 27, 1993

[51] Int. Cl.$^5$ .............................. C08K 9/06
[52] U.S. Cl. .................. 524/120; 523/209; 523/210; 524/151; 524/153; 524/267; 558/71
[58] Field of Search ............ 524/267, 151, 120, 153, 524/409, 410, 415, 416; 558/71; 523/209, 210

[56] References Cited

U.S. PATENT DOCUMENTS

| | | |
|---|---|---|
| 2,469,888 | 10/1942 | Patnode . |
| 3,418,353 | 12/1968 | Brown . |
| 3,886,114 | 5/1975 | Beadle et al. . |
| 3,969,315 | 7/1976 | Beadle et al. . |
| 4,116,926 | 9/1978 | York . |
| 4,197,384 | 4/1980 | Bialous et al. ............ 524/151 |
| 4,221,728 | 9/1980 | Jaquiss et al. ............ 524/267 |
| 4,357,271 | 11/1982 | Rosenquist ............ 524/611 |
| 4,358,556 | 11/1982 | van Abeelen ............ 524/267 |
| 4,394,469 | 7/1983 | Stratta et al. ............ 524/410 |
| 4,430,470 | 2/1984 | Taniguichi et al. ............ 252/609 |
| 4,539,350 | 9/1985 | Abeelen et al. ............ 524/267 |
| 4,670,493 | 6/1987 | Van Asbroeck et al. . |
| 4,707,509 | 11/1987 | Fisch et al. . |
| 4,810,579 | 3/1989 | Neri et al. . |
| 4,867,907 | 9/1989 | Burton et al. . |
| 4,912,155 | 3/1990 | Burton . |
| 4,957,956 | 9/1990 | Neri et al. . |

OTHER PUBLICATIONS

Hyde, et al, Condensation Products of the Organo-silane Diols, Jour. Am. Chem. Society, vol. 63, pp. 1194–1196.
Jour. Chem. Society, vol. 79, pp. 455–458.
Jour. Chem. Society, vol. 95, pp. 313–314 (1909).
Rochow, et al., Polymeric Methyl Silicon Oxides, Jour. Am. Chem. Society, vol. 63, pp. 798–800 (1941).

Primary Examiner—Veronica P. Hoke

[57] ABSTRACT

An organic phosphite composition is provided comprising organic phosphite particles having organic phosphite cores coated with an organic hydrogen polysiloxane. The phosphite particles exhibit high levels of resistance to hydrolysis and are useful as antioxidant additives for thermoplastic compositions.

18 Claims, No Drawings

ORGANOHYDROGEN POLYSILOXANE COATED PHOSPHITES

BACKGROUND OF THE INVENTION

1. Field of the Invention

The present invention relates to solid organic phosphites resistant to hydrolysis, and to the process for preparing them.

Organic phosphites are compounds which are used in the art in order to endow organic polymers with stability characteristics, against the oxidative degradation caused by light and/or heat, such as disclosed, e.g., in U.K. Patent No. 803,557 and U.S. Pat. No. 3,516,963.

The organic phosphites suffer from the undesired characteristic of undergoing phenomena of hydrolysis, in particular during their storage under warm and moist conditions, with the consequent loss of stabilizing activity, and danger of possible handling problems.

It is known to coat solid phosphite powders with dialkoxy or diphenoxy substituted silicones such as those of the formula:

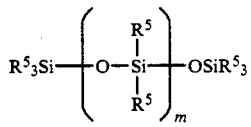

wherein $R^5$ is an alkoxy or phenoxy group and m is greater than 4. Such disubstituted silicones can however undergo a reaction with water, thereby generating an alcohol or phenol which can in turn react with the phosphite. Thus while coatings of disubstituted silicones can provide solid phosphites with some degree of protection from hydrolysis, they themselves can result in degradation through their secondary hydrolysis by-products. Other processes for coating phosphites include treating said powdered phosphites with a monomeric silane containing in its molecule at least two alkoxy groups and causing the silane to hydrolyze, thereby causing the formation of a siliconic polymer on the surface of powder particles but again generating alcohol upon hydrolysis that can react with the phosphite. Neri et al. U.S. Pat. No. 4,810,579 issued Mar. 7, 1989 discloses organic phosphite in powder form treated with a silane containing in its molecule at least two alkoxy groups, and is incorporated herein by reference.

Consequently, there is a desire to improve the hydrolytic stability of silicone coated solid organic phosphites.

SUMMARY OF THE INVENTION

Compositions are provided containing an organic phosphite and an amount of an organohydrogen polysiloxane sufficient to improve the hydrolytic stability of the phosphite, and also provided are organic phosphite particles having a solid phosphite core and an organohydrogen polysiloxane coating surrounding the core. The coating protects the core from hydrolysis.

DETAILED DESCRIPTION OF THE INVENTION

Solid organic phosphites in powder form, with a particle size of from 50 um to 1mm, are treated with an organohydrogen siloxane which is cured to provide coated phosphite particles.

Advantageously, for such a purpose an amount of organohydrogen siloxane of from 0.1 to 10% by weight relatively to the solid phosphite, and, preferably, an amount of the order of from 0.5 to 2% by weight, is used.

The coated phosphite particles exhibit high levels of resistance to hydrolysis.

Suitable phosphites are those which are in solid form at room temperature, and which can be made into a particulate form including granules, pastilles, powders and other particulates, preferably in a powder form.

Suitable phosphites may be defined by means of the general formula:

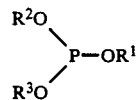

wherein: $R^1$, $R^2$ and $R^3$ represent either equal or different hydrocarbyl radicals, which can be either substituted or non-substituted alkyl, cycloalkyl, aryl, alkaryl or aralkyl radicals.

In particular, trialkyl phosphites, dialkyl monophenyl phosphites, diphenyl monoalkyl phosphites and triphenyl phosphites, possibly bearing hydrocarbyl substituents on the benzene ring, are known and used in the art as phosphite stabilizers.

Specific examples of such organic phosphites are: diphenyl 2-ethylhexyl phosphite, triphenyl phosphite, tris(2,5-di-tert-butyl-phenyl)phosphite, tris(2-tert-butylphenyl)phosphite, tris(2-phenylphenyl)phosphite, tris[2-(1,1-dimethylpropyl]phosphite, tris(2-cyclohexylphenyl)phosphite, tris(2-tert-butyl-4-phenylphenyl)phosphite, tris(2-tert-butyl-4-methylphenyl)phosphite, tris(2,4-di-tert-amylphenyl)phosphte, tris(2,4-di-tert-butylphenyl)phosphite, and 2,2'-methylene bis(4,6-di-t-butylphenyl)octyl phosphite.

Another class of organic phosphites which can be stabilized according to the present invention is definable by means of the general formula:

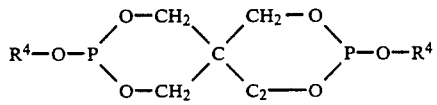

wherein: each $R^4$ radical, is equal to, or different from, each other, represent hydrocarbyl radicals, which can be either substituted or non-substituted alkyl, cycloalkyl, aryl, alkaryl or aralkyl radicals.

Specific examples of such organic phosphites are: bis(2,4-di-tert-butylphenyl)pentaerythritol diphosphite, bis (2,6-di-tert-butyl-4-methylphenyl) pentaerythritol diphosphite, bis (2,4,6-tri-tert-butylphenyl) pentaerythritol diphosphite,and distearyl pentaerythritol diphosphite.

A phosphonite may be used in place of a phosphite. This phosphonite may be chosen from polyphenylene diphosphonites and their substituted derivatives. Examples of such compounds appear in the SANDOZ Pat. No. BE-A-774,363.

In particular, mention may be made of 4,4'-diphenylenediphosphonites and tetrakis(isooctyl), tetrakis(2,4-ditert-butylphenyl), and tetrakis(3-nonylphenyl)4,4',4''-p-terphenylenediphosphonites.

An especially preferred phosphonite is tetrakis(2,4-ditert-butylphenyl)4,4'-diphenylenediphosphonite. A specific phosphonite is tetrakis(2,4-di-tert-butylphenyl)-4,4'-diphenylenediphosphonite

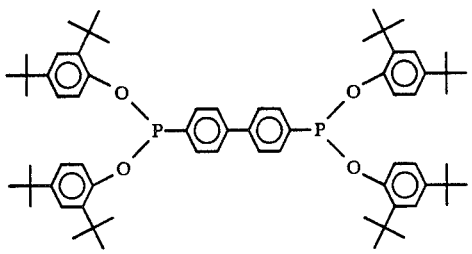

marketed by Ciba-Geigy under the name Irgafos PEPQ and Sandoz under the name Sandostab P-EPQ.

The phosphite may also be in the form of a fluorophosphonite such as sold under the trademark Ethyl 398 sold by Ethyl Corporation. Fluorophosphorous compounds are also set out in Burton U.S. Pat. No. 4,912,155, issued Mar. 27, 1990, which is incorporated herein by reference.

Suitable particles may also be in the form of pastille type granules set out in Neri et al U.S. Pat. No. 4,957,956 issued Dec. 18, 1990 which is incorporated herein by reference. The phosphites may be blended with other materials such as other stabilizers such as thermal, UV stabilizers and primary antioxidants, and neutralizers, prior to being coated. These other materials may also be used as intermediate layers between the phosphite core and the organohydrogen polysiloxane layer. The phosphites used are generally hydrolysis prone phosphites.

Generally speaking, the organopolysiloxane coatings starting materials employed in preparing the products of the present invention are organohydrogen polysiloxanes having the formula:

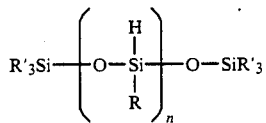

where R, R' and n are as defined below. In accordance with the preferred embodiment, in which R is methyl, the preferred starting materials employed in the practice of the present invention can be described as liquid trimethylsilyl chain-stopped methyl hydrogen polysiloxanes containing an average of from 4 to 10 methyl hydrogen siloxane units per molecule. These organohydrogen polysiloxanes are well known in the art.

Suitable organohydrogen polysiloxanes are disclosed in Kipping, Journal of the Chemical Society, Vol. 79, pages 455–458; Hyde, Journal of the American Chemical Society, Vol. 63, pages 1194-1196 (1941); Martin and Kipping, Journal of the Chemical Society, Vol. 95, pages 313-4 (1909); Rochow, Journal of the American Chemical Society, Vol. 63, pages 798-800(1941); Wright U.S. Pat. No. 3,418,353, all of which are incorporated herein by reference.

The organohydrogen polysiloxane coatings may be obtained by applying an organohydrogen siloxane to the phosphite particulates by spraying, followed by heat and/or moisture (water) curing of the siloxane to form the polysiloxane coating. For example, methyl dichlorosilane may be reacted with water (H₂O) to form dimethylsilane diol which then can be polymerized to form polyhydrogen methyl siloxane.

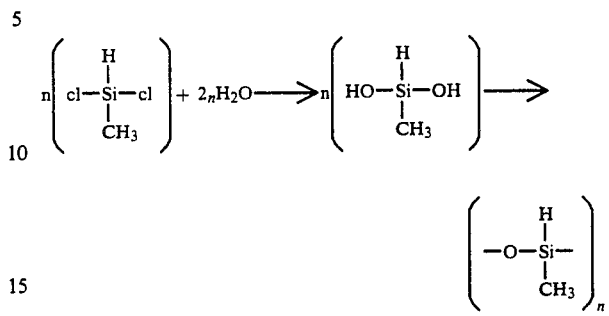

Suitable siloxane compositions comprise a siloxane of the formula:

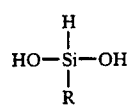

wherein R is defined herein and a chain stopping additive of the formula:

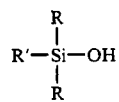

Alternatively, the coating may be applied by placing the organic phosphite, in a powder form, suspended in an inert solvent wherein the same phosphite is insoluble, or substantially insoluble, wherein the solvent contains the organohydrogen siloxane. Examples of such solvents are liquid aliphatic hydrocarbons, such as hexane and heptane.

The suspension is kept stirred, by operating at room temperature (20°-25° C.), for a time of from 10 to 120 minutes. The solvent is then evaporated off under reduced pressure and a powder is recovered, which is heated to a temperature preferably comprised within the range of from 100° to 140° C., by operating under a reduced pressure and for a time of from 10 minutes to 12 hours, such as to remove any possible solvent traces, and cause the siliconic polymer to form on the surface of the particles of the organic phosphite.

According to a further form of practical embodiment on the organic phosphite powder, the organohydrogen siloxane, preferably diluted in an inert organic solvent, is sprayed. These operations are advantageously carried out at room temperature (20°-25° C.), and the so-treated powder of the organic phosphite is then heated under a reduced pressure, in a way similar to as set out above.

When the treatment process is carried out under the above indicated conditions, the treated organic phosphite will preferably have a melting point higher than approximately 100° C.

Particularly good results are obtained by applying the process of the present invention to the stabilization of the following phosphites: bis(2,4-di-tert-butylphenyl)-pentaerythritol diphosphite; di-stearyl pentaerythritol diphosphite; and tris(2,4-di-tert-butylphenyl)phosphite.

The preferred organohydrogen siloxane is of the formula:

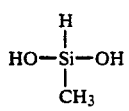

and the preferred chain stopping agent is:

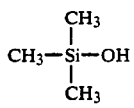

The resultant organic phosphite composition has organic phosphite particles having solid phosphite particulate cores and organohydrogen polysiloxane coatings attached to the core, surrounding the core, and protecting the core from moisture. Preferably, the organohydrogen polysiloxane is of the formula:

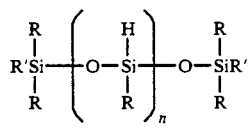

wherein R is a member selected from the group consisting of alkyl and aryl radicals, R'' is a member selected from the group consisting of hydrogen, alkyl and aryl radicals, and n has an average value selected from 4 to 40; more preferably R is methyl, and R' is most preferably methyl. The coating acts as a shell or outer barrier layer which protects the inner phosphite core from atmospheric moisture.

The organic phosphite compositions may be used as thermal oxidative stabilizers for organic materials such as thermoplastic compositions. Suitable, thermoplastic compositions include those comprising polyethylene, polypropylene, polycarbonate, polybutylene terephthalate, polyethylene terephthalate, polyvinyl chloride, polystyrene, polyamides and acrylonitrile-butadiene-styrene graft copolymers.

The phosphite core may comprise further additives such as ultraviolet light stabilizers/absorbers, phenolic antioxidants, neutralizers, i.e., metal carboxylates, metal hydroxy carboxylates, hydrotalcites, oxides, chelates, hindered amine stabilizers, and organic bases such as triisopropanolamine.

The preferred phosphites include bis(2,4-di-tert-butyl phenyl) pentaerythritol diphosphite, distearyl pentaerythritol diphosphite and tris(2,4-di-tert-butylphenyl) phosphite.

The following examples illustrate the present invention, but are not meant to limit the scope thereof.

EXAMPLES

Examples A–J are comparative examples. Examples 1–5 illustrate the advantages of the present invention. Samples of silicone fluids (DMPS, a dimethyl polysiloxane, and MHPS, a methylhydrogen polysiloxane), were obtained from General Electric Company and tested at 0–5% loadings on granulated bis(2,4-di-tert-butylphenyl) pentaerythritol diphosphite with approximately 1% its weight triisopropanol amine (available from GE Specialty Chemicals Inc. as Ultranox ® 626A phosphite (PDP). The silicone was simply added to the phosphite in a small vial, which was then placed in an automatic shaker for an hour. At this point 0–5% of a synthetic hydrotalcite (stearic acid treated Mg 4.5 Al 2 OH13CO$_3$-3.5 H$_2$O) sold as grade DHT-4A by Kyowa Industries Limited (SHT) were also added to the vials, and the samples shaken again for an hour. Significantly less dusting was observed in vials containing silicones.

This was intended as a screening test, and no quantitative measurement of silicone dispersion was made. As a simple qualitative test, a small amount of carbon black was added to one sample, and appeared to be well distributed within five minutes of shaking.

After the two hours of shaking, the coated PDP phosphite samples were transferred to aluminum dishes and placed in the humidity chamber at 30° C./75RH (RH=% relative humity), and weight changes were monitored daily. It should be noted that because of the large number of samples, only one silicone fluid was tested at a time. Several months passed between the testing of the first silicone and the last, which is reflected in the loss of hydrolytic stability of the base PDP phosphite in the data below.

The samples of MHPS, showed significant weight loss when stored as a neat additive under these temperature/humidity conditions. This weight loss can be seen in the following tables, and is the most probable cause of the small initial weight loss seen in some of the coated samples. DMPS contributed to hydrolytic stability, but to a lesser extent than MHPS. The Delta t (time) represents the days of additional stability obtained based on the addition of the additive.

TABLE 1

| Example | DMPS loading level | SHT loading level | Time to 1% weight gain | Delta t (days) |
|---|---|---|---|---|
| A | 0% | 0% | 3.9 days | 0 |
| B | 1% | 0% | 4.0 days | 0.1 |
| C | 3% | 0% | 4.2 days | 0.3 |
| D | 5% | 0% | 4.6 days | 0.7 |
| E | 0% | 1% | 4.2 days | 0.3 |
| F | 0% | 5% | 4.3 days | 0.4 |
| G | 5% | 5% | 5.3 days | 1.4 |

This data shows a correlation between DMPS loading levels and time to 1% weight gain. Here the benefits of SHT and the DMPS appear complementary, suggesting they are acting by different pathways. Results are presented on PDP phosphite that has been dry-coated with MHPS, a silicone that will react with active hydrogen compounds. The data is complicated by the rapid and unexplained weight loss exhibited by the neat silicone additive, and the spillage of one sample during weighing. A similar formulation was added to the data table to help compensate for the lost sample. Time below is in days.

TABLE II

| Example | MHPS loading level | SHT loading level | Time to 1% weight gain | Delta t (days) |
|---|---|---|---|---|
| H | 0% | 0% | 3.2 | 0 |
| 1 | 1% | 0% | 4.0 | 0.8 |
| 2 | 3% | 0% | 5.5 | 2.3 |
| 3 | 5% | 0% | >5 (spilled) | >1.8 |
| 4 | 5% | 1% | 7.0 | 3.8 |
| I | 0% | 1% | 3.9 | 0.7 |
| J | 0% | 5% | 4.0 | 0.8 |
| 5 | 5% | 5% | 7.4 | 4.2 |

The greatest impact from SHT was seen with the first 1% loaded, with higher levels providing little extra stability. The effects of MHPS and SHT were seen to be somewhat complementary. Note that the Delta t for the MHPS coated phosphite was much higher than the corresponding Delta t values for the DMPS coated phosphites, indicating he improved stabilizing effect of MHPS over DMPS.

We claim:

1. An organic phosphite composition comprising: a an organic phosphite particle comprising
   i) a solid organic phosphite core, and
   ii) an organohydrogen polysiloxane coating attached to said core, said coating protecting said phosphite core from moisture.

2. The composition of claim 1 wherein said coating consists essentially of an organohydrogen polysiloxane of the formula:

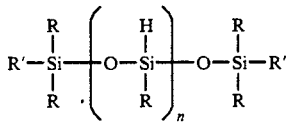

wherein R is a member selected from the group consisting of alkyl and aryl radicals, R' is a member selected from the group consisting of hydrogen alkyl and aryl radicals, and n has an average value selected from 4 to 40.

3. The composition of claim 2 wherein R is methyl, and R' is selected from the group consisting of hydrogen and methyl.

4. The composition of claim 3 wherein R' is methyl.

5. The composition of claim 1 wherein said organic phosphite particle consists of:
   i) the solid organic core, and
   ii) the organic hydrogen polysiloxane coating attached to the core.

6. A thermoplastic composition comprising a thermoplastic resin and an effective amount of the organic composition of claim 1 to enhance the thermal oxidative stability of said thermoplastic composition.

7. The thermoplastic composition of claim 6 wherein said thermoplastic resin is selected from the group consisting of polyethylene, polypropylene, polycarbonate, polybutylene terephthalate, polyethylene terephthalate, acrylonitrile-butadiene-styrene graft copolymers, polystyrene, polyamide and polyvinyl chloride polymers.

8. The composition of claim 1 wherein said composition is in powder form.

9. An organic phosphite particle exhibiting enhanced hydrolytic stability, said particle comprising:
   i) a solid organic phosphite core, and
   ii) an organohydrogen polysiloxane coating surrounding said core.

10. The particle of claim 9 wherein said organohydrogen polysiloxane coating consists essentially of organohydrogen polysiloxanes having the formula:

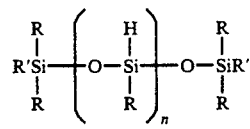

wherein R' is selected from the group consisting of hydrogen and methyl groups, R is methyl, and n has an average value of from 4 to 40.

11. The particle of claim 9 wherein said organic phosphite core comprises bis(2,4-di-t-butylphenyl) pentaerythritol diphosphite.

12. The composition of claim 1 wherein said compositions consists essentially of said core and said coating.

13. The particle of claim 9 wherein said particle consists essentially of said core and said coating.

14. A composition comprising
    (a) an organic phosphite, and
    (b) an amount of an organohydrogen polysiloxane sufficient to improve the hydrolytic stability of said phosphite.

15. The composition of claim 14 wherein said composition consists essentially of said phosphite and said organohydrogen polysiloxane.

16. The composition of claim 14 wherein said composition consists of said phosphite and said organohydrogen polysiloxane.

17. The composition of claim 14 wherein said organohydrogen polysiloxane is polymethylhydrogen siloxane.

18. The phosphite particles of claim 9 wherein an intermediate layer of a solid phenolic antioxidant is located between the core and the coating.

* * * * *